(12) United States Patent
Nurmela et al.

(10) Patent No.: US 12,363,749 B2
(45) Date of Patent: Jul. 15, 2025

(54) USER DEVICE SCHEDULING

(71) Applicant: Nokia Technologies OY, Espoo (FI)

(72) Inventors: Vuokko Tatjana Nurmela, Espoo (FI);
Filippo Tosato, Bures sur Yvette (FR);
Stefan Wesemann, Kornwestheim (DE)

(73) Assignee: Nokia Technologies Oy, Espoo (FI)

( * ) Notice: Subject to any disclaimer, the term of this patent is extended or adjusted under 35 U.S.C. 154(b) by 403 days.

(21) Appl. No.: 17/736,260

(22) Filed: May 4, 2022

(65) Prior Publication Data

US 2022/0377758 A1 Nov. 24, 2022

(30) Foreign Application Priority Data

May 20, 2021 (FI) .................................... 20215600

(51) Int. Cl.
*H04W 72/542* (2023.01)

(52) U.S. Cl.
CPC ................. *H04W 72/542* (2023.01)

(58) Field of Classification Search
CPC . H04W 72/542; H04B 7/0619; H04B 7/0452; H04B 7/0697; H04B 7/043; H04L 25/0204; H04L 1/0026
See application file for complete search history.

(56) References Cited

U.S. PATENT DOCUMENTS

| | | | |
|---|---|---|---|
| 7,620,019 B1 | 11/2009 | Smith et al. | |
| 2011/0281600 A1* | 11/2011 | Tanaka | H04B 7/024 455/500 |
| 2016/0353424 A1 | 12/2016 | Stirling-Gallacher et al. | |
| 2017/0244451 A1 | 8/2017 | Raghavan et al. | |
| 2018/0054241 A1* | 2/2018 | Pi | H04B 7/0421 |
| 2018/0220436 A1* | 8/2018 | Athley | H04W 72/121 |
| 2021/0175919 A1* | 6/2021 | Badic | H04W 72/0446 |

FOREIGN PATENT DOCUMENTS

| | | |
|---|---|---|
| WO | WO-2019/190538 A1 | 10/2019 |
| WO | WO-2021/0026212 A1 | 2/2021 |

OTHER PUBLICATIONS

Office Action dated May 17, 2022 issued in corresponding Finnish No. 20215600.
Extended Search Report for European No. 22169493.8 dated Mar. 6, 2023.
Yang Long et al., "Robust Adaptive Beamforming for Uniform Linear Arrays With Sensor Gain and Phase Uncertainties," IEEE Access, vol. 7, pp. 2677-2685.
Partial European Search Report dated Oct. 17, 2022, issued in corresponding European Patent Application No. 22169493.8.

* cited by examiner

*Primary Examiner* — Thai Nguyen
(74) *Attorney, Agent, or Firm* — Harness, Dickey & Pierce, P.L.C.

(57) ABSTRACT

An apparatus, method, and non-transitory computer readable medium performing estimating spatial overlap of beams associated with one or more combinations of at least two user devices of a plurality of user devices of a mobile communications system based, at least in part, on angular direction of radiated power of the user devices, wherein the user devices include candidate user devices to be scheduled on a network resource for multi user channel transmission; and determining scheduling metrics associated with the one or more combinations of the at least two user devices of the plurality of user devices based on the estimated spatial overlap.

12 Claims, 8 Drawing Sheets

USER DEVICE SCHEDULING

CROSS-REFERENCE TO RELATED APPLICATIONS

This application claims priority to and the benefit of Finnish Patent Application No. 20215600 filed on May 20, 2021, the entire contents of each of which are incorporated herein by reference.

FIELD

The present specification relates to scheduling of user devices in multi-user mobile communications systems.

BACKGROUND

Multiple user devices which cause minimal interference can be scheduled on same time frequency resources. There remains a need for further improvements in this field.

SUMMARY

In a first aspect, this specification provides an apparatus comprising means for performing: estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission; and determining scheduling metrics associated with the one or more combinations of the at least two user devices of the plurality of user devices based on the estimated spatial overlap.

In some examples, the means for performing estimating spatial overlap estimates said spatial overlap based on an angular power spectrum associated with channel state information vectors of the at least two user devices, wherein the angular power spectra is determined from channel state information of the respective user devices.

In some examples, the scheduling metrics provide an indication of similarity of angular power spectra of the at least two user devices.

In some examples, the means for performing determining scheduling metrics further comprising means for performing: modelling phase perturbation(s) of channel coefficients provided by a channel state information vector of the first user device with respect to angular variations to provide a perturbed channel state information vector of the first user device for use in estimating said spatial correlation.

In some examples, the means for performing determining the scheduling metrics further comprises means for performing: calculating a correlation between a channel state information vector of a respective second user device and the perturbed channel state information vector of a first user device; and estimating a power of interference between the perturbed channel state information vector of the first user device and the channel state information vector of the respective second user device.

In some examples, the means for performing estimating said power of interference estimates said power of interference over a first range of angles.

In some examples, the means for performing estimating said power of interference estimates said power of interference in a receiving direction of the first user device.

In some examples, the scheduling metrics provide an indication of interference between user devices, wherein the indication can be used for determining scheduling of user devices on network resource(s) for multi user channel transmission.

In some examples, one or more of the combinations comprise a pair of user devices.

In some examples, the scheduling metrics are determined with respect to a first user device scheduled for transmission, wherein the means for performing determining the scheduling metrics comprises means for performing determining scheduling metrics of one or more combinations of the first user device with at least one second user device.

The means may comprise: at least one processor; and at least one memory including computer program code, the at least one memory and the computer program code configured, with the at least one processor, to cause the performance of the apparatus.

In a second aspect, the specification describes a method comprising: estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission; and determining scheduling metrics associated with the one or more combinations of the at least two user devices of the plurality of user devices based on the estimated spatial overlap.

In some examples, performing estimating spatial overlap comprises estimating said spatial overlap based on an angular power spectrum associated with channel state information vectors of the at least two user devices, wherein the angular power spectra is determined from channel state information of the respective user devices.

In some examples, the scheduling metrics provide an indication of similarity of angular power spectra of the at least two user devices.

In some examples, performing determining scheduling metrics further comprises performing: modelling phase perturbation(s) of channel coefficients provided by a channel state information vector of the first user device with respect to angular variations to provide a perturbed channel state information vector of the first user device for use in estimating said spatial correlation.

In some examples, performing determining the scheduling metrics further comprises performing: calculating a correlation between a channel state information vector of a respective second user device and the perturbed channel state information vector of a first user device; and estimating a power of interference between the perturbed channel state information vector of the first user device and the channel state information vector of the respective second user device.

In some examples, performing estimating said power of interference further comprises estimating said power of interference over a first range of angles.

In some examples, performing estimating said power of interference further comprises estimating said power of interference in a receiving direction of the first user device.

In some examples, the scheduling metrics provide an indication of interference between user devices, wherein the indication can be used for determining scheduling of user devices on network resource(s) for multi user channel transmission.

In some examples, one or more of the combinations comprise a pair of user devices.

In some examples, the scheduling metrics are determined with respect to a first user device scheduled for transmission, wherein the means for performing determining the scheduling metrics comprises means for performing determining scheduling metrics of one or more combinations of the first user device with at least one second user device.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission; and determining scheduling metrics associated with the one or more combinations of the at least two user devices of the plurality of user devices based on the estimated spatial overlap.

In a sixth aspect, this specification describes a computer-readable medium (such as a non-transitory computer-readable medium) comprising program instructions stored thereon for performing at least the following: estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission; and determining scheduling metrics associated with the one or more combinations of the at least two user devices of the plurality of user devices based on the estimated spatial overlap.

In a seventh aspect, this specification describes a work product comprising a database or a lookup table, created by means of the method described with reference to the second aspect.

In an eighth aspect, this specification describes an apparatus comprising: at least one processor; and at least one memory including computer program code which, when executed by the at least one processor, causes the apparatus to: estimate spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission; and determine scheduling metrics associated with the one or more combinations of the at least two user devices of the plurality of user devices based on the estimated spatial overlap.

In a ninth aspect, this specification describes an apparatus comprising: a first module configured to estimate spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission; and a second module configured to determine scheduling metrics associated with the one or more combinations of the at least two user devices of the plurality of user devices based on the estimated spatial overlap.

BRIEF DESCRIPTION OF DRAWINGS

Example embodiments will now be described, by way of non-limiting examples, with reference to the following schematic drawings, in which.

DETAILED DESCRIPTION

Figure 1:
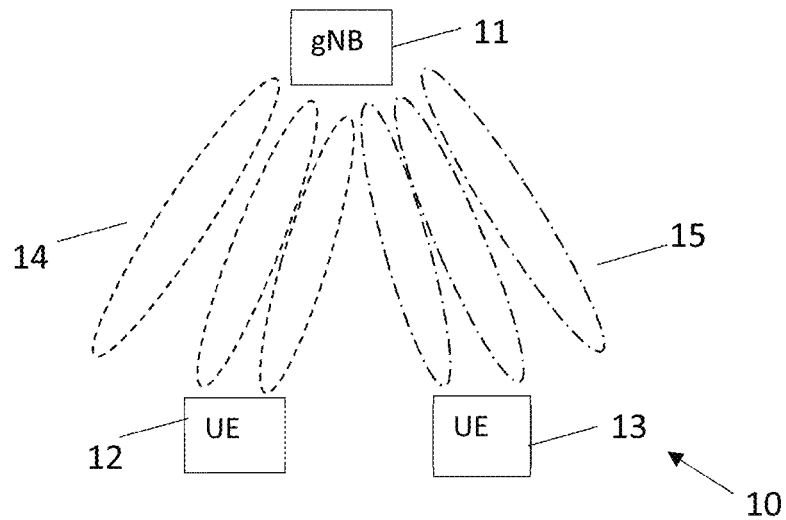
FIG. 1 is a block diagram of an example system.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of an example system, indicated generally by the reference numeral 10. The system 10 is a mobile communications system comprising a base station (gNB) 11, and a plurality of user devices 12 and 13. For example, the user device 12 may be associated with a first plurality of beams 14 and the user device 13 may be associated with a second plurality of beams 15. The beams may be used for communication with the base station 11 or other devices in the mobile communications system.

In multiple user multiple input multiple output (MU-MIMO) systems, user devices may be scheduled on the same resources (e.g. time-frequency resources in a channel, such as a physical downlink shared channel) based on which user devices cause minimum interference between each other. As such, interference between co-scheduled user devices in the resource is minimized. In one example, scheduling of user devices in the same resources may depend on their respective propagation channel and/or their respective spatial filters. For example, if a channel between the base station 11 and user devices 12 and 13 comprise a high number of common propagation paths, and if these paths are illuminated by beams used by the base station 11, the user devices 12 and 13 may not be a good pair of user devices to be scheduled on the same resources.

Figure 2:
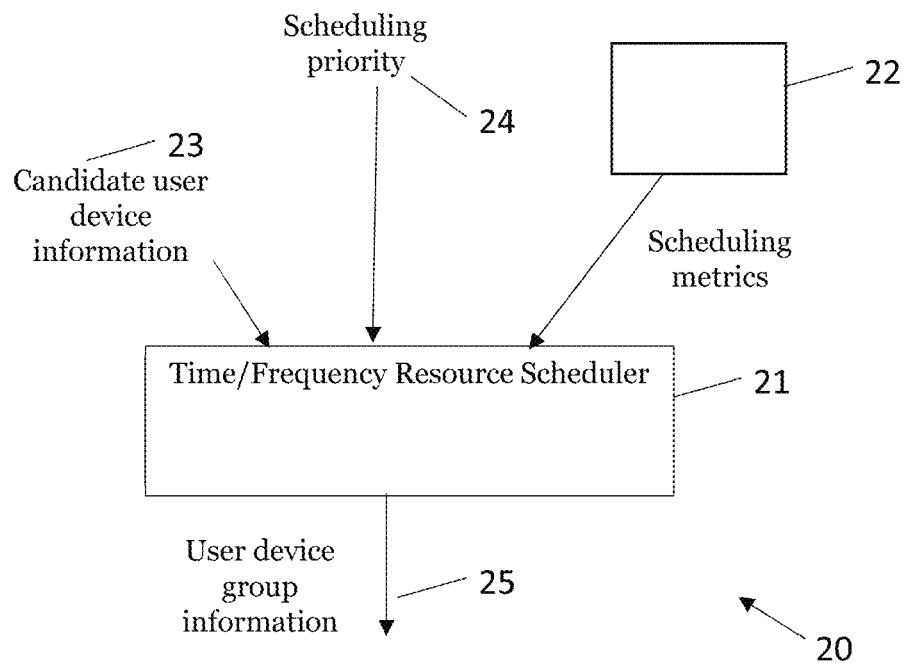
FIG. 2 is a block diagram of a system in accordance with an example embodiment.

FIG. 2 is a block diagram of a system, indicated generally by the reference numeral 20, in accordance with an example embodiment. System 20 comprises a time-frequency resource scheduler 21 responsible for grouping user devices to be scheduled together in the same time-frequency resources. The user devices may be grouped such that interference is minimized. For example, the scheduler 21 may receive as inputs one or more of candidate user device information 23, scheduling priority information 24, and scheduling metrics, and may provide as outputs user device group information 25. The scheduling metrics may be provided by a first module 22, and the determining of the scheduling metrics by the first module 22 is described in detail in accordance with example embodiments below.

Interference between user devices (e.g. inter-UE interference) may be calculated based on channel state information (e.g. channel matrix or covariance matrix) associated with the respective UEs, and the channel state information should ideally be accurate. Channel state information (CSI) may be obtained by a gNB from a UE's beam reporting or codebook-based CSI reporting including a precoder matrix indicator (PMI), or from sounding reference signal (SRS) measurements, by exploiting full or partial uplink-downlink channel reciprocity. In either case, full channel matrix may not be available at the gNB. This limited CSI at the transmitter may also be affected by many imperfections that further impact the ability of the transmitter to estimate cross-UE interference precisely. Limited accuracy of the CSI reports due to factors such as subband granularity of the PMI, quantisation errors, channel variations due to aging and Doppler spread/mobility, lack of knowledge of the UE's receive spatial filter, etc. may cause CSI imperfections. In a frequency division duplex (FDD) system, for example, all information that is available for estimating the inter-UE interference may be the beams and/or PMI reported by the UEs. The compatibility of these beams/PMI may be required to be evaluated for the user device scheduling.

In ideal conditions of non-time varying channel and perfect channel state information, a simple pairing metric based on cross-correlation between the CSI vectors (either reported by the UEs, or measured in the uplink by the gNB) may be sufficient to calculate the interference power between candidate UEs. However, in non-ideal conditions, uncertainties in the CSI available at the gNB may require more robust solutions to determine UE interference.

There remains a need for designing UE scheduling metrics that may be robust against the imperfections of the reported beams/PMI. In MU-MIMO systems, pairing decisions based on the cross-correlation (i.e., inner product) of the beamforming vectors may not take into account inter-UE interference, which may be caused if the channel has some angular spread or if the UE is not exactly located at the top of the main lobe of the beam, which may be a common occurrence.

The example embodiments described below provide methods for determining scheduling metrics, such that the scheduling metrics may be used by a scheduler, such as the time frequency scheduler 21, to determine whether two or more user devices should be scheduled in the same resource.

Figure 3:
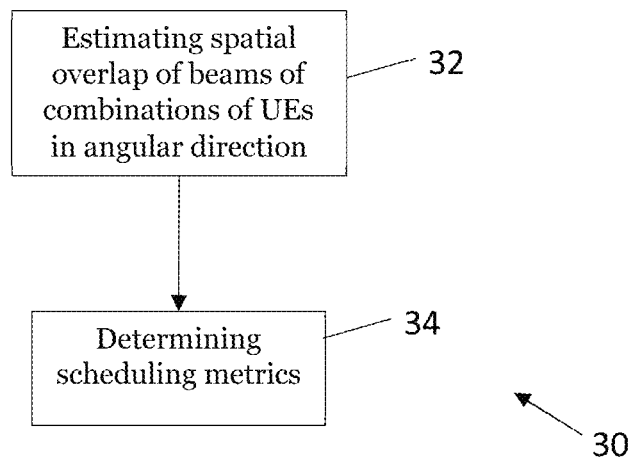
FIGS. 3 and 4 are flow charts of algorithms in accordance with example embodiments.

FIG. 3 is a flowchart of an algorithm, indicated generally by the reference numeral 30, in accordance with an example embodiment.

The algorithm 30 starts with estimating, at operation 32, spatial overlap of beams associated with one or more combinations of at least two user devices (e.g. user devices 12 and 13 described above with reference to FIG. 1) of a plurality of user devices of a mobile communications system. The spatial overlap may be estimated based, at least in part, on angular direction of radiated power of the user devices. For example, the user devices may comprise candidate user devices to be scheduled on a network resource for multi user channel transmission. In one example, one or more of the combinations comprise a pair of user devices.

Next, at operation 34, scheduling metrics associated with the one or more combinations of the at least two user devices of the plurality of user devices are determined based on the estimated spatial overlap.

In one example, the scheduling metrics provide an indication of interference between user devices. The indication can be used for determining, for example at the time-frequency resource scheduler 21, scheduling of user devices on network resource(s) for multi user channel transmission. In one example, the time frequency scheduler is comprised within a base station (gNB, such as the base station 11).

In one example, the scheduling metrics are determined with respect to a first user device scheduled for transmission. For example, the scheduling metrics may be determined for one or more combinations of the first user device with at least one second user device.

Some of the example embodiments described below provide methods for determining scheduling metrics that expand the spatial cross-correlation measure in the angular domain by using angular power spectra (APS) of the reported CSIs. For example, an overlap of angular power spectra (APS) of two beams may provide a measure for the amount of common propagation paths that they would illuminate, which may be a good prediction for the inter-UE interference. This technique may be used for both downlink and/or uplink transmission.

Figure 4:
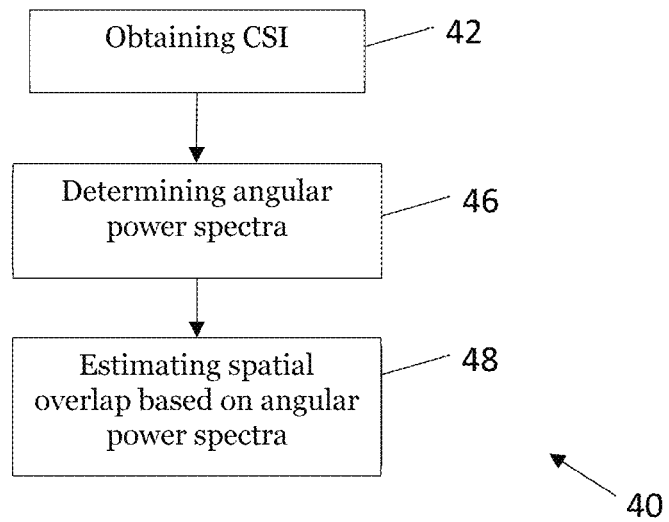
Figure 5:
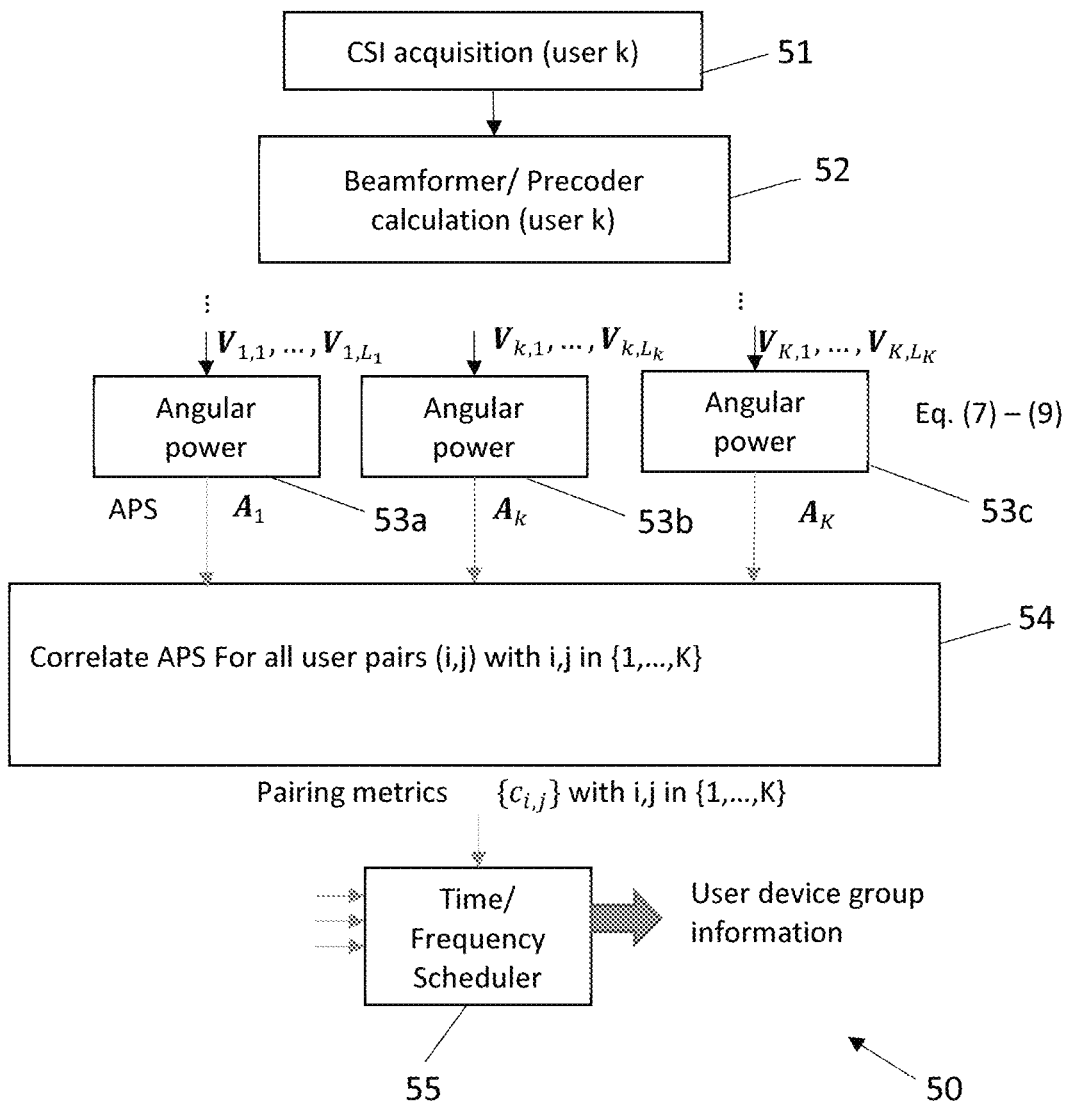
FIG. 5 is a block diagram of a system in accordance with an example embodiment.
Figure 6:
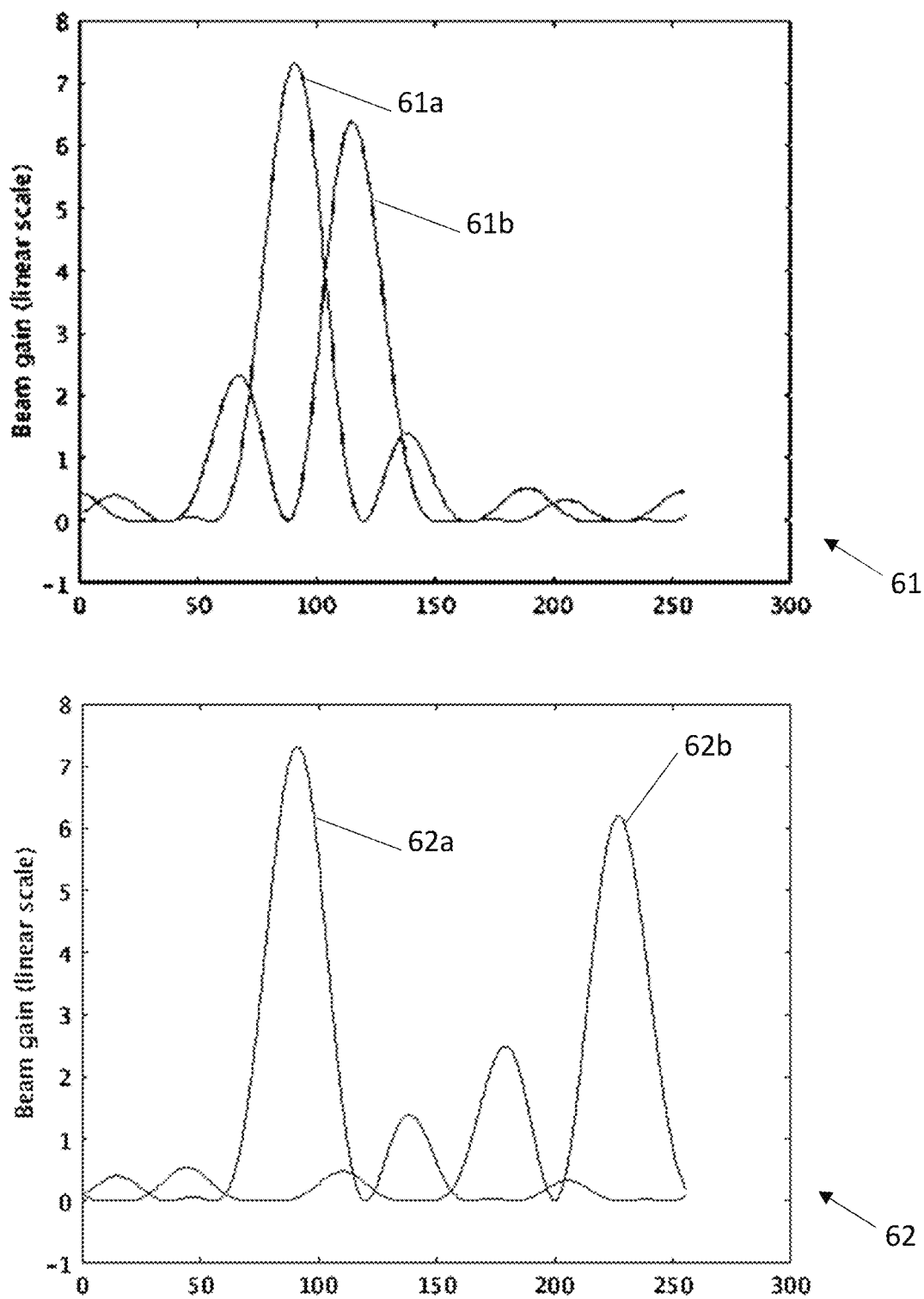
FIG. 6 shows plots of data obtained in accordance with example embodiments.

FIGS. 4 to 6 described below may relate to a first example implementation for determining scheduling metrics.

FIG. 4 is a flowchart of an algorithm, indicated generally by the reference numeral 40, in accordance with an example embodiment. The algorithm 40 may be used for determining scheduling metrics for a combination of two or more user devices (e.g. a pair of user devices), for example, based on spatial overlap between the user devices.

At operation 42, channel state information (CSI) vectors of the two or more user devices may be obtained. For example, CSI vectors may be obtained from the user devices' beam reporting or codebook-based CSI reporting including a precoder matrix indicator (PMI), or from sounding reference signal (SRS) measurements. As such, the CSI vectors may be obtained from one or more of uplink SRS measurements, Type 1 UE feedback information (i.e., (CRI/) RI/PMI), Type 2 UE feedback information, and/or CRI feedback from UE (e.g. in case of grid of beams (GoB) usage).

At operation 46, the angular power spectra for the beams of the respective user devices are determined. For example, the angular power spectrum (two dimensional) for a respective user device may be indicative of the beam shapes (one dimensional) in a plurality of angles. The angular power spectrum for each user device may be determined based on the channel state information vectors of the respective user device. For example, the angular power spectrum may be obtained using Fast Fourier Transform.

At operation 48, spatial overlap between the beams of the two or more user devices, in the angular domain, is estimated based the determined angular power spectra associated with channel state information vectors of the at least two user devices, wherein the angular power spectra is determined from channel state information of the respective user devices.

In one example, spatial overlap of beams is determined for a plurality of angles. As such, the estimated spatial overlap is considered to indicate the overlap of the beams across the whole angular power spectra of the beams. As discussed earlier, the estimated spatial overlap may then be used for determining the scheduling metrics for the two or more user devices.

In one example, the scheduling metrics provide an indication of similarity of angular power spectra of the two or more user devices. For example, the higher the similarity, the higher the interference may be if the two user devices were to be scheduled on the same time frequency resource. Therefore, the time-frequency resource scheduler 21 may use the scheduling metrics to make decisions regarding the scheduling of user devices in the available time-frequency resources.

The scheduling metrics are described in further detail with reference to the examples below.

In one example, a base station (gNB) transmitting with a uniform rectangular array (URA) formed by $N_1$ horizontal and $N_z$ vertical cross-polarised array elements, with $N_t = N_1 N_2$, the k-th transmit steering vector, $a_t(\vartheta,\varphi)$, of size $N_t \times 1$, may be given by equation 1 below (e.g. assuming that there is no z-axis steering component):

$$a_t(\vartheta,\varphi) = a_{t,y} \otimes a_{t,x} \tag{1}$$

As an example, the x-axis transmit steering vector associated to a propagation path from the transmit array to a point in the far field, $a_{t,x}$, may be given by equation (2) below, where $d_x$ is the distance between the horizontal elements of the array:

$$a_{t,x} = \begin{bmatrix} 1 & e^{j2\pi \frac{d_x}{\lambda_0} \sin\varphi} & \ldots & e^{j2\pi (N_2-1)\frac{d_x}{\lambda_0} \sin\varphi} \end{bmatrix}^T \tag{2}$$

The y-axis transmit steering vector, $a_{t,y}$, may be given by equation (3) below:

$$a_{t,y} = \begin{bmatrix} 1 & e^{j2\pi \frac{d_y}{\lambda_0} \cos\vartheta} & \ldots & e^{j2\pi (N_1-1)\frac{d_y}{\lambda_0} \cos\vartheta} \end{bmatrix}^T \tag{3}$$

where $d_y$ is the distance between the vertical elements of the array, $\lambda_0$ is the wavelength of the carrier frequency, $\vartheta$ and $\varphi$ are the zenith angle of departure (ZOD) and azimuth angle of departure (AOD), respectively.

These steering vectors (e.g. corresponding to the CSI and angular power spectrum (e.g. determined in operations 42 and 46 described with respect to FIG. 4)) may constitute a good approximation for an URA, as long as the zenith angle is relatively close to 90 degrees. Other types (e.g. more complex) modelling of the steering vectors is also possible.

For example, let $V_i = [v_{i,1}, v_{i,2}, \ldots, v_{i,L_i}]$ be an $N_t \times L_i$ matrix of unit-norm precoding weight vectors indicated by a rank-$L_i$ CSI reported by user i, for one of the two polarisations. In the following examples, it may be assumed that the calculations are carried out on one of the two polarisations under an assumption that the beam pattern is the same on both polarisations. However, the example embodiments may also be applied to both polarisations separately or jointly with straightforward modifications. Alternatively, or in addition, the example embodiments may be applied by defining polarization as a separate dimension (in addition to a vertical dimension and horizontal dimension), such that estimating the spatial overlap further comprises determining the overlap in polarizations.

For example, the angular power spectrum (APS) (e.g. as determined in operation 46 with reference to FIG. 4), of CSI vector l, with $l=1, \ldots, L_i$, of user i, at angular coordinates $(\vartheta, \varphi)$, may be given by the real-valued function of equation (4) below:

$$A_{i,l}(\vartheta,\varphi) = |a_t^H v_{i,l}|^2 = a_{t,x}^H V_{i,l} a_{t,y}^*|^2 \tag{4}$$

where $V_{i,l}$ is a matrix of size $N_1 \times N_2$ obtained from vector vi, by rearranging its elements according to the transmit array geometry. The second equality in equation (4) may follow from the matrix identity: $ABC = (C^T \otimes A) \text{vec}(B)$. Therefore, the APS for user i, aggregated over the $L_i$ layers, can be defined as shown in equation (5) below:

$$A_i(\vartheta, \varphi) = \sum_{l=1}^{L_i} A_{i,l}(\vartheta, \varphi) = a_t^H V_i V_i^H a_t \tag{5}$$

As discussed earlier, the scheduling metrics between the user devices may be obtained from measuring the correlation between angular power spectrums (APSs) associated with CSI vectors of two candidate UEs. The APS may be a real-valued function indicating the radiation power in the angular direction associated to a steering vector (e.g. as shown in equations (2) and (3) above). The scheduling metrics may therefore be used for the purpose of avoiding co-scheduling UEs whose CSIs form spatial beams that radiate predominantly in the same angular directions. The scheduling metric determined in the example embodiments is not based on any assumption on the physical propagation channel between gNB and UEs, and aims at minimising the spatial overlap between the beams associated with the UEs in all angular directions.

FIG. 5 is a block diagram of a system, indicated generally by the reference numeral 50, in accordance with an example embodiment. System 50 is shown with a functional block diagram to describe, in further detail, how angular power spectra are determined and used for user device scheduling.

At module 51, channel state information (CSI) of two or more user devices (e.g. user k) is obtained (e.g. from the UE reporting or measured by the gNB). At an optional module 52, weights, such as beamformer or precoding weights, may be determined for the beam(s) associated with the user devices (user k), for example, using beamformer or precoder calculations. For example, the determined weights may be used in advanced calculations of angular power spectrum, such as for suppressing inter-cell interference.

At module 53, angular power spectrum of the user devices may be determined. In one example, the steering vectors, as obtained using equations (2) and (3) above, may be replaced with oversampled Discrete Fourier Transform (DFT) vectors. Operations at modules 53a, 53b, and 53c are described below with respect to equations (7), (8), and (9) respectively. For example, let $O_1$ and $O_2$ be oversampling factor in the horizontal and vertical axis, respectively, and $W_N$ be a DFT matrix of size N×N.

In one example, the angular power spectrum is obtained using Fast Fourier Transform (FFT). For example, an interpolated angular spectrum may be provided as a function of a respective angle by padding the steering vector with zeroes before the FFT. This may allow increasing density of samples in the angular domain (i.e. sufficient amount of zeroes added the BF vector), such that the overlap of the beams may be obtained for all relevant angles. The number of zeroes to be added may be chosen such that the length of the weight vector plus the amount of additional zeroes results into a power of two, which enables utilizing the FFT efficiently. For example, this may be done for vertical and horizontal directions independently and combined using a Kronecker product.

After the FFT, the APS of the beam can be calculated, for example, as shown in equation (6) below:

$$APS = |FFT(w)|^2 \quad (6)$$

so where w is the weight vector with additional zeros. A zero-padded matrix $V_{i,l}^O$, obtained from $V_{i,l}$ by adding $O_1$ rows and $O_2$ columns of zeros.

The discrete values of the APS function obtained by replacing the steering vectors in (4) with oversampled DFT vectors can be arranged in matrix $A_{i,l}$ of size $N_1 O_1 \times N_2 O_2$, given by equation (7) below:

$$A_{i,l} = B_{i,l} \odot B_{i,l}^* \quad (6)$$

where $$B_{i,l} = W_{N_1 O_1}^T V_{i,l}^O W_{N_2 O_2} \quad (7)$$

Matrix $B_{i,l}$ is an oversampled 2D DFT of matrix $V_{i,l}$. Hence, the discrete APS for user i may be obtained in matrix notation from equation (5) as shown in equation (9) below:

$$A_i = \sum_{l=1}^{L_i} A_{i,l} \quad (8)$$

At module 54, scheduling metrics (e.g. pairing metrics) may be determined for user j with respect to user i, where the scheduling metrics may be calculated as a correlation measure (e.g. the spatial overlap determined in operation 48 described with respect to FIG. 4) between the APS of the two users. The correlation may generally be shown by equation (10) below:

$$c_{i,j} = \frac{\int_\vartheta \int_\varphi A_i(\vartheta, \varphi) A_j(\vartheta, \varphi)}{\left(\int_\vartheta \int_\varphi A_i(\vartheta, \varphi)\right)^{\frac{1}{2}} \left(\int_\vartheta \int_\varphi A_j(\vartheta, \varphi)\right)^{\frac{1}{2}}} \quad (10)$$

In some examples, the scheduling metrics $c_{i,j}$, as shown by equation (10), may be calculated by replacing the integrals with a summation over a finite set of angular values. The scheduling metrics may be calculated (e.g. operation 34 described with reference to FIG. 3) on a discrete set of angular values corresponding to a set of DFT vectors, and can be written as shown in equation (11) below:

$$c_{i,j} = \frac{tr(A_i^T A_j)}{\|A_i\|_F \|A_j\|_F}. \quad (11)$$

The determined scheduling metrics may then be provided to the time-frequency scheduler 55 (e.g. similar to the scheduler 21), such that the scheduler may use the scheduling metrics to determine user device group information.

FIG. 6 shows plots, indicated generally by the reference numerals 61 and 62, of angular power spectrums, in accordance with an example embodiments.

In the plot 61, line 61a represents angular power spectrum of a first user device, and the line 61b represents angular power spectrum of a second user device. The weight vectors of the beams corresponding to the first and second user device are orthogonal, such that the cross-correlation of the weight vectors of the first and second user device is shown to be zero in plot 61. The APSs of plot 61a and 61b are shown to be significantly overlapping, and are therefore likely to cause MU-interference in a channel with some angular spread, even though the cross-correlation of the BF weight vectors is zero.

In the plot 62, line 62a represents angular power spectrum of the first user device and the line 62b represents angular power spectrum of the second user device. The APSs of plots 62a and 62b are shown to have relatively little overlap, even though the cross-correlation of BF weight vectors is larger than zero.

The overlap in angular power spectrums in plot 61 is relatively higher than that in plot 62, even though the cross-correlation of weight vectors in plot 61 is lower than that in plot 62. Therefore, the comparison between plots 61 and 62 may demonstrate, how the overlap of the beams and thus potential inter-UE interference may not be predictable from the cross-correlation of the BF vectors alone.

In one example, when the APS is determined, the scheduling metric m may be calculated (e.g. in operation 34 described with reference to FIG. 3) as an overlap of each pair of APS e.g. by summing over the element-wise product of the APS, as shown in equation (12) so below:

$$m = \sum_\varphi APS_1(\varphi) \cdot APS_2(\varphi) \quad (9)$$

The scheduling metrics may give a measure of the similarity of the two APS, i.e. how much they illuminate the same propagation paths. If the integral of the element-wise product of the two APS is large, a high overlap and potentially high inter-beam interference may be indicated.

In one example, if there some additional information of channels is available (e.g. CSI obtained e.g. from SRS measurements, in addition to UE reported CSI), the additional information may be utilized for the determination of the scheduling metrics. Weights may be applied to certain angles, for example by applying higher weights to angles where a propagation path is known to be present. However, CSI obtained from UE feedback (e.g. using a codebook), without the additional SRS measurements, is also likely to adequately represent directions of dominant propagation paths, such that the scheduling metrics provide a good indication of overlap of beams, and inter-beam interference.

In one example, a threshold may be set for the scheduling metrics (e.g. m parameter), such that the time-frequency scheduler may use the threshold to make scheduling decisions. For example, the threshold may be set such that if spatial overlap between beams of a first and second UE is higher than the threshold, the first and second UEs may not be co-scheduled. In one example, the threshold may be dynamically adjusted during the scheduling process, so that the BS could learn to make better pairing decisions. In an environment with a lot of angular spread the overlap of beams is likely to create more inter-beam interference, than in an environment where most UEs are at line of sight (LoS). The pairing metric m can also be used without a threshold, and may be provided as input for the scheduler to weight scheduling decisions differently.

Figure 7:
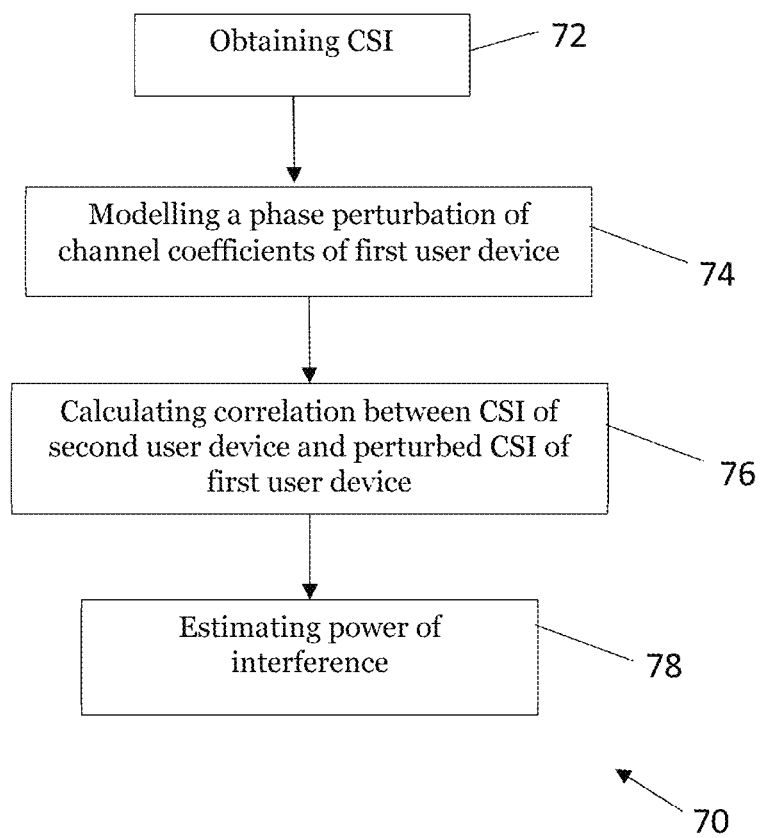
FIG. 7 is a flow chart of an algorithm in accordance with an example embodiments.
Figure 8:
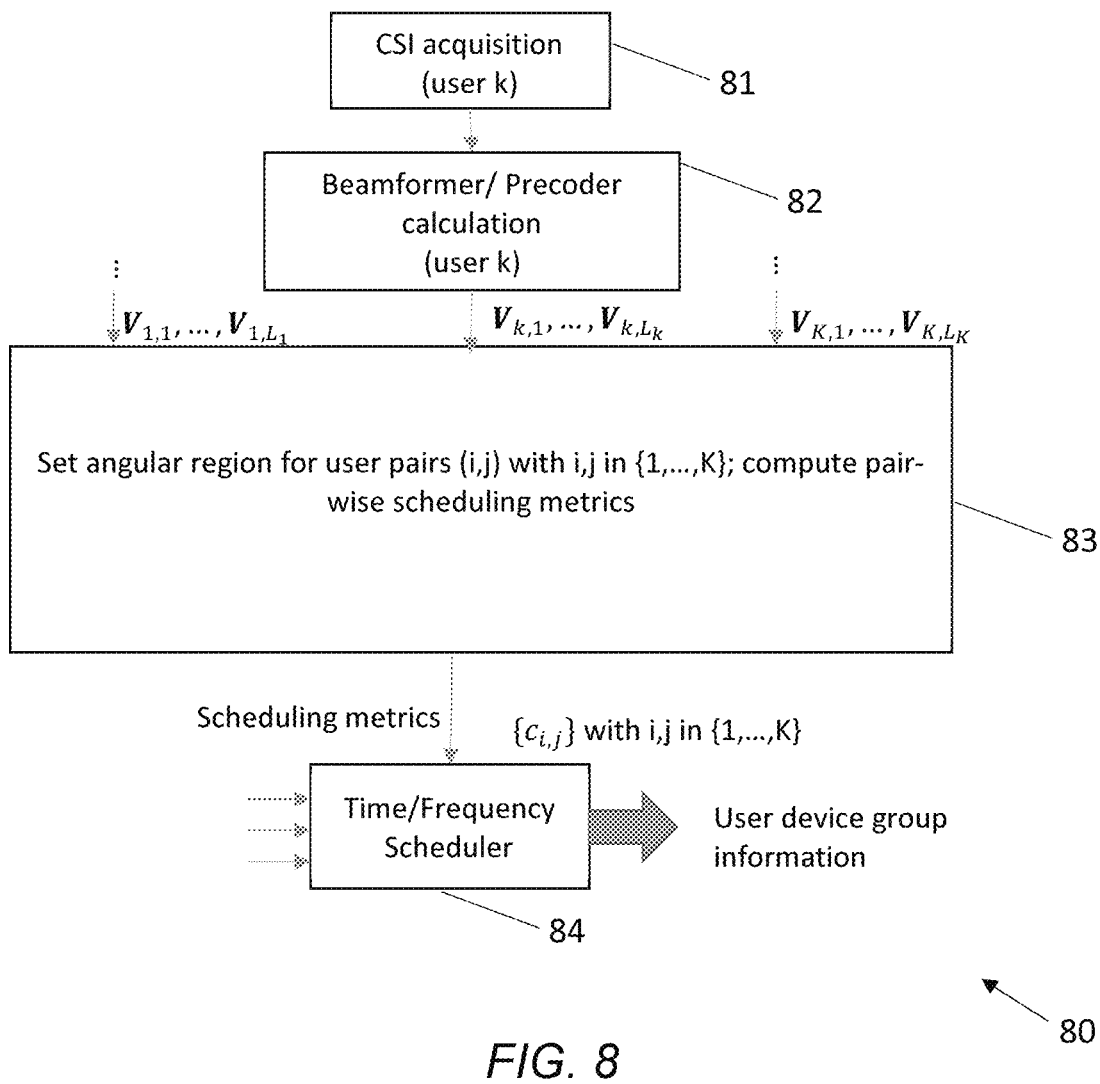
FIG. 8 is a block diagram of a system in accordance with an example embodiment.

FIGS. 7 to 8 described below may relate to a second example implementation for determining scheduling metrics.

FIG. 7 is a flowchart of an algorithm, indicated generally by the reference numeral 70, in so accordance with an example embodiment. Algorithm 70 provides an alternative technique (without the use of angular power spectrum) of determining spatial overlap and scheduling metrics (operations 32 and 34 described above with reference to FIG. 3).

At operation 72, channel state information (e.g. channel state information (CSI) vectors) of two or more user devices may be obtained. For example, the two or more user devices comprise a first user device and a second user device.

Next, operation 74 comprises modelling phase perturbation(s) of channel coefficients provided by the channel state information vector of the first user device with respect to angular variations. A perturbed channel state information vector is therefore provided for use in estimating the spatial overlap (e.g. spatial correlation). The modelled phase perturbation(s) may relate to an effective channel for the first user device in a plurality of transmission layers. A plurality of phase perturbations may be generated corresponding to a plurality of points in an angular region respectively. As such, contrary to the example embodiments described with reference to FIGS. 4 to 6, relating to determination of angular power spectrum, a small number of angular sampling points within a pre-defined angular region may be considered for phase perturbation, instead of considering the full angular power spectrum.

At operation 76, a correlation between the channel state information vector of the second user device and the perturbed channel state information vector of the first user device may be calculated.

At operation 78, power of interference between the perturbed channel state information vector of the first user device and the channel state information vector of the second user device may be estimated based on the calculated correlation.

The operations of the algorithm 70 may be performed for a plurality of combinations of two or more user devices of a plurality of user devices in order to obtain scheduling metrics for the plurality of combinations.

In one example embodiment, the power of interference is estimated over a first range of angles, such as the pre-defined angular region for which the phase perturbation is performed. For example, the power of interference is estimated in a receiving direction (downlink) of the first user device.

In one example embodiment, the first user device may be scheduled for transmission, and the scheduling metric may be determined for scheduling the first user device with the second user device. The second user device may be a candidate for co-scheduling with the first user device. The scheduling metric for a candidate co-scheduled UE (e.g. the second UE) may be obtained by correlating (e.g. operation 76) its CSIs with an estimate of the effective channel of the first UE. The effective channel can be estimated for each of the transmission layers of the first UE and can be obtained, for example, by applying a steering vector to the corresponding reported CSI. Applying a steering vector in this manner may be useful as a reported CSI may be a quantised representation of the effective channel for a transmission layer at the time of CSI calculation. Further, the modelling of the phase perturbation may take into account the effect of channel variations due to aging, Doppler, or the like, on the phase of the effective channel coefficients by applying a steering vector, and may assume that variations in amplitudes can be neglected. The modelling may use an approximate of channel frequency response between each transmit antenna and a certain combination of receive antennas associated with a transmission layer, in a subband. A subband is formed by a number of consecutive resource blocks (RBs) and is the frequency unit for which a CSI is reported. Hence, the effective channel may be frequency flat in a subband, such that the effective channel can be modelled by a single propagation path and the phase variations can be modelled by a steering vector.

In one example embodiment, an estimate of the effective channel for layer $l_i$ of user i, may be available at the gNB, for example, through the CSI vector $v_{i,l}$ and the gNB models (e.g. in operation 74 described with reference to FIG. 7) the phase uncertainty on this estimate by applying a steering vector as described in equation (1) above. Hence, the effective channel for layer $l_i$ of user i, at angular coordinates $(\vartheta, \varphi)$ may be modelled as shown in equation (13) below:

$$h_{i,l}(\vartheta,\varphi)=a_t(\vartheta,\varphi)\odot v_{i,l} \tag{10}$$

The effective channel as shown in equation (10) may represent the $N_t$ complex coefficients of the effective channel frequency response for layer i of user i in a generic subband, under the assumption this subband size is much smaller than the coherence bandwidth of the channel, such that the channel can be assumed frequency flat within a subband.

An APS of layer $l_j$ of user j, with respect to the channel $h_{i,l_i}(\vartheta, \varphi)$ of user i may be defined, by modifying equation (4) above, as shown in equation (14) below:

$$C_{i,l_i,j,l_j}(\vartheta,\varphi)=|h_{i,l_i}{}^H v_{j,l_j}|=|a_t{}^H(v_{i,l_i}{}^*\odot v_{j,l_j})|=a_{t,x}{}^H (V_{i,l_i}{}^*\odot V_{j,l_j})a_{t,y}{}^*| \tag{11}$$

where, the second equality uses the vector identity: $(a\odot b)^T c=a^T(b\odot c)$.

A measure power of interference between the two precoding vectors may be obtained (e.g. operation 78 described with reference to FIG. 7) by integrating the function shown in equation (9) over an angular region of uncertainty R, as shown in equation (15) below:

$$c_{i,l_i,j,l_j}=\iint_{(\vartheta,\varphi)\in R}C_{i,l_i,j,l_j}(\vartheta,\varphi) \tag{12}$$

In case of fully accurate channel information, $R=\{(0,0)\}$ and the function shown in equation (12) returns the value: $c_{i,l_i,j,l_j}=C_{i,l_i,j,l_j}(0,0)=|v_{i,l_i}{}^H v_{j,l_j}|$ which value may be the amplitude of the cross-correlation between the precoding vectors $v_{i,l_i}$ and $v_{j,l_j}$.

The scheduling metric for user j with respect to user i may be calculated (e.g. operation 34 described with reference to FIG. 3) as the cumulative interference between all pairs of precoders and, in general, can be written as shown in equation (16) below:

$$c_{i,j} = \sum_{l_i=1}^{L_i} \sum_{l_j=1}^{L_j} c_{i,l_i,j,l_j} \tag{13}$$

In case of fully accurate channel information, the equation (9) may return the value: $c_{i,j}=\sum_{l_i=1}^{L_i}\sum_{l_j=1}^{L_j}|v_{i,l_i}{}^H v_{j,l_j}|$.

FIG. 8 is a block diagram of a system, indicated generally by the reference numeral 80, so in accordance with an example embodiment. At module 81, CSI vectors may be obtained for two or more user devices (user k), and at module 82, beamformer or precoder calculations may be performed. Operations performed at modules 81 and 82 may be similar to operations performed at modules 51 and 52 described above with reference to FIG. 5.

In one example embodiment, the continuous functions shown in equations

(11) and (12) may be calculated on a discrete domain and a 2D DFT may replace the steering vector. In particular, because the angular region of interest is limited around the origin, the calculation of the APS function shown in equation

(11) may be limited to a small subset of oversampled DFT components.

At module 83, a region of interest may be set for the pair of user devices including the first and second user device, and pair-wise scheduling metrics may be computed accordingly.

For example, the region of interest is rectangular of sides $R_1$ and $R_2$ in the horizontal and vertical axis, respectively. The discrete samples of the APS function as shown by equation

(11) can be arranged in a matrix $c_{i,l_i,j,l_j}$ of size $R_1 \times R_2$, obtained by a 2D DFT operation on a limited range of components, as shown in equation (17) below:

$$C_{i,l_i,j,l_j} = W_{N_1 O_1}^T ((V_{i,l_i}^O)^* \odot V_{j,l_j}^O) W_{N_2 O_2} \qquad (14)$$

where $W_{N_1 O_1}$ has size $N_1 O_1 \times R_1$ and $W_{N_2 O_2}$ has size $N_2 O_2 \times R_2$. The interference measure as shown by equation (12), over a discrete set, becomes the entry-wise 1-norm of $c_{i,l_i,j,l_j}$, i.e., as shown in equation (18) below:

$$c_{i,l_i,j,l_j} = \|C_{i,l_i,j,l_j}\|_{1,1} = \sum_{p=1}^{R_1} \sum_{q=1}^{R_2} \{C_{i,l_i,j,l_j}\}_{p,q} \qquad (15)$$

In one example, for all user pairs (i,j) with i,j in $\{1, \ldots, K\}$, the interference measure may be shown in the matrix as shown in equation (19) below:

$$c_{i,j} = \sum_{l_i=1}^{L_i} \sum_{l_j=1}^{L_j} \sum_{p=1}^{R_1} \sum_{q=1}^{R_2} \{W_{N_1 O_1}^T ((V_{i,l_i}^O)^* \odot V_{j,l_j}^O) W_{N_2 O_2}\}_{p,q} \qquad (19)$$

The scheduling metrics (e.g. the interference measures described above) may be provided to the time-frequency scheduler 84, which then provides user device group information as outputs based on the scheduling metrics.

Figure 9:
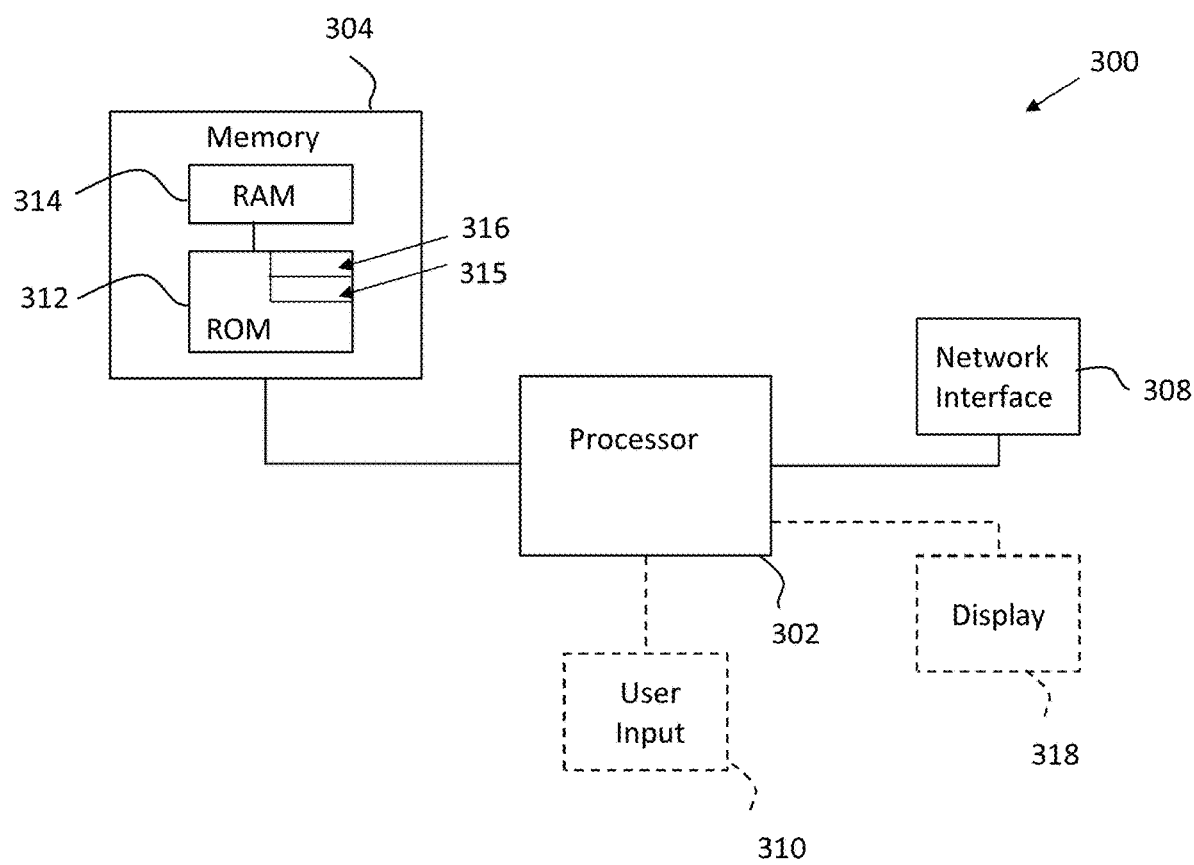
FIG. 9 is a block diagram of a system in accordance with an example embodiment.

For completeness, FIG. 9 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 40, 50, 70, and 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 10A:
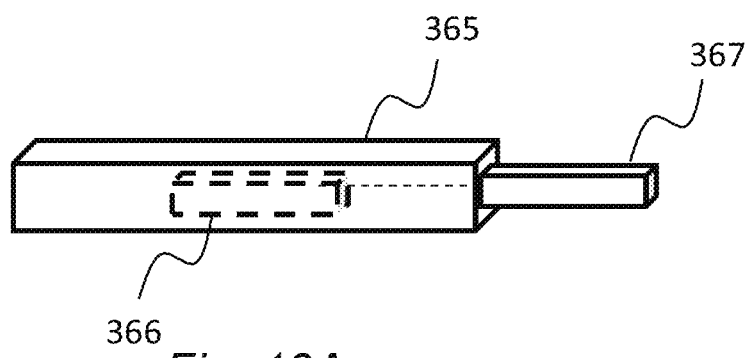
FIGS. 10A and 10B show tangible media, respectively a removable non-volatile memory unit and a compact disc (CD) storing computer-readable code which when run by a computer perform operations according to embodiments.
Figure 10B:
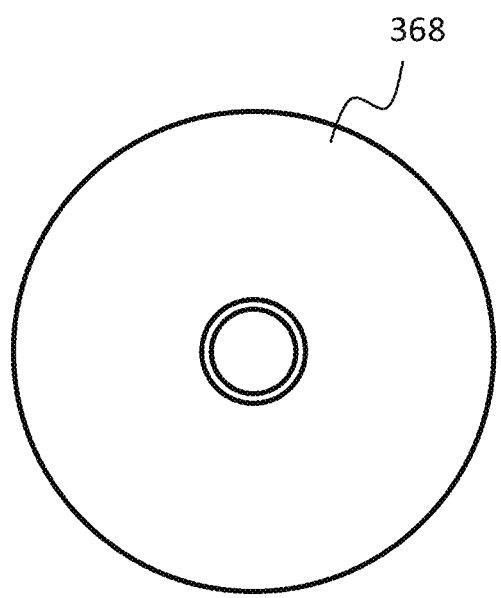

FIGS. 10A and 10B show tangible media, respectively a removable memory unit 365 and a compact disc (CD) 368, storing computer-readable code which when run by a computer may perform methods according to example embodiments described above.

The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3, 4, 5, 7, and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to so cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
   at least one processor; and
   at least one memory including computer program code, the at least one memory and the computer program code configured, with the at least one processor, to cause the apparatus to perform
      estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission,
      determining scheduling metrics associated with the one or more combinations of the at least two user devices of the plurality of user devices based on the estimated spatial overlap, and
      modeling phase perturbation(s) of channel coefficients provided by a channel state information vector of a first user device with respect to angular variations to provide a perturbed channel state information vector of the first user device for use in estimating said spatial overlap.

2. The apparatus as claimed in claim 1, wherein the estimating spatial overlap estimates said spatial overlap based on an angular power spectrum associated with channel state information vectors of the at least two user devices, wherein the angular power spectra is determined from channel state information of the respective user devices.

3. The apparatus as claimed in claim 2, wherein the scheduling metrics provide an indication of similarity of angular power spectra of the at least two user devices.

4. The apparatus as claimed in claim 1, wherein the determining the scheduling metrics comprises:
   calculating a correlation between a channel state information vector of a respective second user device and the perturbed channel state information vector of the first user device; and
   estimating a power of interference between the perturbed channel state information vector of the first user device and the channel state information vector of the respective second user device.

5. The apparatus as claimed in claim 4, wherein the estimating said power of interference estimates said power of interference over a first range of angles.

6. The apparatus as claimed in claim 4, wherein the estimating said power of interference estimates said power of interference in a receiving direction of the first user device.

7. The apparatus as claimed in claim 1, wherein the scheduling metrics provide an indication of interference between user devices, wherein the indication can be used for determining scheduling of user devices on network resource(s) for multi user channel transmission.

8. The apparatus as claimed in claim 1, wherein one or more of the combinations comprise a pair of user devices.

9. The apparatus as claimed in claim 1, wherein the scheduling metrics are determined with respect to the first user device scheduled for transmission, wherein the determining the scheduling metrics comprises determining scheduling metrics of one or more combinations of the first user device with at least one second user device.

10. A method comprising:
    estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission;
    determining scheduling metrics associated with the one or more combinations of the at least two user devices of the plurality of user devices based on the estimated spatial overlap; and
    modeling phase perturbation(s) of channel coefficients provided by a channel state information vector of a first user device with respect to angular variations to provide a perturbed channel state information vector of the first user device for use in estimating said spatial overlap.

11. The method as claimed in claim 10, wherein the scheduling metrics provide an indication of interference between user devices, wherein the indication can be used for determining scheduling of user devices on network resource(s) for multi user channel transmission.

12. A non-transitory computer readable medium storing computer program instructions, which when executed by a processor of an apparatus, cause the apparatus to perform:
    estimating spatial overlap of beams associated with one or more combinations of at least two user devices of a plurality of user devices of a mobile communications system based, at least in part, on angular direction of radiated power of the user devices, wherein the user devices comprise candidate user devices to be scheduled on a network resource for multi user channel transmission;
    determining scheduling metrics associated with the one or more combinations of the at least two user devices of the plurality of user devices based on the estimated spatial overlap; and
    modeling phase perturbation(s) of channel coefficients provided by a channel state information vector of a first user device with respect to angular variations to provide a perturbed channel state information vector of the first user device for use in estimating said spatial overlap.

\* \* \* \* \*